US011114966B2

(12) United States Patent
Sinervo

(10) Patent No.: US 11,114,966 B2
(45) Date of Patent: Sep. 7, 2021

(54) DEVICE AND METHOD FOR DETERMINING ROTATION OF AN INDUCTION MACHINE

(71) Applicant: Danfoss Editron Oy, Lappeenranta (FI)

(72) Inventor: Anssi Sakari Sinervo, Lappeenranta (FI)

(73) Assignee: Danfoss Editron Oy, Lappeenranta (FI)

(*) Notice: Subject to any disclaimer, the term of this patent is extended or adjusted under 35 U.S.C. 154(b) by 0 days.

(21) Appl. No.: 16/861,391

(22) Filed: Apr. 29, 2020

(65) Prior Publication Data

US 2020/0350845 A1 Nov. 5, 2020

(30) Foreign Application Priority Data

Apr. 30, 2019 (EP) ..................................... 19171846

(51) Int. Cl.
*H02P 21/24* (2016.01)
*H02P 21/18* (2016.01)
(Continued)

(52) U.S. Cl.
CPC .............. *H02P 21/24* (2016.02); *H02P 21/18* (2016.02); *H02P 25/02* (2013.01); *H02P 27/08* (2013.01)

(58) Field of Classification Search
USPC ....................................................... 318/560
See application file for complete search history.

(56) References Cited

U.S. PATENT DOCUMENTS

| 4,926,105 A | * | 5/1990 | Mischenko | ............. H02P 21/06 318/800 |
| 5,559,419 A | * | 9/1996 | Jansen | ................. H02K 17/165 318/804 |

(Continued)

FOREIGN PATENT DOCUMENTS

| EP | 1049243 A2 | 11/2000 |
| EP | 1536552 A1 | 6/2005 |
| JP | 2007274900 A | 10/2007 |

OTHER PUBLICATIONS

K, Kondo, "Re-stating technologies for rotational sensorless controlled AC motors at the rotating status" 2015 10th Asian Control Conference (ASCC), IEEE, May 31, 2015 (May 31, 2015), pp. 1-6.

(Continued)

*Primary Examiner* — Bentsu Ro
(74) *Attorney, Agent, or Firm* — McCormick, Paulding & Huber PLLC

(57) ABSTRACT

A device for estimating a rotation speed and/or a direction of rotation of an induction machine is presented. The device controls stator voltages (uu, uv, uw) of the induction machine so that a voltage space-vector constituted by the stator voltages has a fixed direction and a current space-vector constituted by stator currents (iu, iv, iw) of the induction machine has a pre-determined length or a predetermined d-component. The rotation speed and/or the direction of rotation is/are estimated based on a waveform of a q-component of the current space-vector, where the d-component of the current space-vector is parallel with the voltage space-vector and the q-component of the current space-vector is perpendicular to the voltage space-vector. The device is usable when the induction machine does not have enough magnetic flux for flux-based determination of the rotation speed and/or the direction of rotation.

14 Claims, 4 Drawing Sheets

(51) Int. Cl.
 *H02P 25/02* (2016.01)
 *H02P 27/08* (2006.01)

(56) References Cited

U.S. PATENT DOCUMENTS

| | | | | |
|---|---|---|---|---|
| 6,239,575 B1 * | 5/2001 | Xu | ............... | B60L 15/025 |
| | | | | 318/801 |
| 7,539,549 B1 * | 5/2009 | Discenzo | ............ | F04D 15/0077 |
| | | | | 324/765.01 |
| 8,405,344 B2 * | 3/2013 | Heikkila | ............... | G01P 3/44 |
| | | | | 318/802 |
| 2009/0284211 A1 * | 11/2009 | Gao | ............... | G01R 31/343 |
| | | | | 318/727 |
| 2012/0098472 A1 | 4/2012 | Wrobel et al. | | |

OTHER PUBLICATIONS

Extended European Search Report for European Application Serial No. 19171846.9 dated Oct. 14, 2019.

* cited by examiner

DEVICE AND METHOD FOR DETERMINING ROTATION OF AN INDUCTION MACHINE

CROSS-REFERENCE TO RELATED APPLICATION

This application claims foreign priority benefits under 35 U.S.C. § 119 to European Patent Application No. 19171846.9 filed on Apr. 30, 2019, the content of which is hereby incorporated by reference in its entirety.

TECHNICAL FIELD

The disclosure relates to a device and to a method for estimating rotation speed and/or a direction of rotation of an induction machine. The device is usable when the induction machine does not have enough magnetic flux for flux-based determination of the rotation speed and/or the direction of rotation. Furthermore, the disclosure relates to a power electronic converter for driving an induction machine. Furthermore, the disclosure relates to a computer program for estimating rotation speed and/or a direction of rotation of an induction machine.

BACKGROUND

In many cases there is a need to energize a rotating induction machine the rotation speed of which is not measured, and which does not have enough magnetic flux for flux-based determination of the rotation speed and/or the direction of rotation. This type of scenario rises with applications where there is no tachometer or other speed measurement means and where an induction machine restarts after a power switch-off before the rotor stops rotating but after the magnetic flux has vanished. In applications of the kind mentioned above, a device supplying the induction machine such as e.g. a power electronic converter magnetizes the induction machine with voltages constituting a rotating voltage space-vector. If the rotation direction and/or the rotation speed of the voltage space-vector differ too much from the rotation direction and the rotation speed of the rotor, there can be generated high currents which may damage the induction machine and/or the device supplying the induction machine. The situation can be especially problematic when the voltage space-vector and the rotor of the induction machine have opposite directions of rotation. Therefore, there is a need to estimate the direction of rotation of the rotor and advantageously also the rotation speed of the rotor prior to starting to magnetize the induction machine with voltages constituting a rotating voltage space-vector.

A known method for estimating rotation speed and/or a direction of rotation of an induction machine comprises supplying a direct current pulse to stator windings of the induction machine and measuring stator voltages that are dependent on the direction and speed of rotation. A challenge related to this method is that the rotating dependent components of the stator voltages are small and that the stator voltages have a switching ripple as well as other components related to stator resistance and stator stray inductance. Thus, based on the above-mentioned stator voltages, it is challenging to estimate the rotation speed and/or the direction of rotation reliably enough.

Publications JP2007274900 and EP1536552 describe methods for determining rotation speed and direction of a free running induction machine. The methods are based on supplying direct current to the stator of the induction machine in a first space vector direction and detecting behavior of current induced in a second space vector direction perpendicular to the first space vector direction.

Publication US2012098472 describes a mechanism for a motor controller for engaging a spinning motor. A power section is configured to provide power to the motor. A control is configured to control the power section. The control is configured to search for a motor frequency of the motor by applying a small excitation voltage to the motor, and the excitation voltage is initially applied at a voltage frequency which is a maximum frequency. The control is configured to track the motor frequency until the motor frequency is below an equivalent speed command and engage the motor by applying a higher voltage to the motor.

Publication EP1049243 describes a system that comprises means for determining a stator voltage vector, for measuring a stator winding current vector, for deriving an estimated or model stator flux vector based on the current and voltage vectors, and for deriving a stator current vector demand value based on the flux vector. A current regulator produces a value for the stator voltage vector so that the stator current is regulated to the demand value.

Publication Kondo Keiichiro: "*Re-stating technologies for rotational sensorless controlled AC motors at the rotating status*", 2015 $10^{th}$ Asian Control Conference (ASCC), IEEE, 31 May 2015, pages 1-6 describes restarting methods associated with rotational sensorless control methods both for induction machines and permanent magnet synchronous machines.

SUMMARY

The following presents a simplified summary to provide a basic understanding of some aspects of different invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying and non-limiting embodiments of the invention.

In accordance with the invention, there is provided a new device for estimating rotation speed and/or a direction of rotation of an induction machine when the induction machine does not have enough magnetic flux for flux-based determination of the rotation speed and/or the direction of rotation. A device according to the invention comprises a processing system implemented with one or more processor circuits configured to:

control stator voltages of the induction machine to constitute a voltage space-vector having a fixed direction with respect to the stator of the induction machine, control a length of the voltage space-vector to regulate stator currents of the induction machine to fulfill a condition that a current space-vector constituted by the stator currents has a pre-determined length, and estimate at least one of the following based on a waveform of a q-component of the current space-vector: rotation speed of the rotor of the induction machine, a direction of rotation of the rotor, wherein the d-component of the current space-vector is parallel with the voltage space-vector and the q-component of the current space-vector is perpendicular to the voltage space-vector.

The stator currents are inherently filtered by the windings of the induction machine and thus, compared to methods based on voltages, it is easier to form sufficiently reliable estimates for the rotation speed and/or the direction of rotation of the induction machine based on the waveform of the q-component of the current space-vector.

In accordance with the invention, there is provided also a new power electronic converter that comprises:
- a converter stage for forming stator voltages for an induction machine,
- a controller for controlling the stator voltages at least partly based on stator currents of the induction machine, and
- a device according to the invention for estimating at least one of the following: a rotation speed of the rotor of the induction machine, a direction of rotation of the rotor.

In accordance with the invention, there is provided also a new method for estimating rotation speed and/or a direction of rotation of an induction machine when the induction machine does not have enough magnetic flux for flux-based determination of the rotation speed and/or the direction of rotation. A method according to the invention comprises:
- controlling stator voltages of an induction machine to constitute a voltage space-vector having a fixed direction with respect to the stator of the induction machine,
- controlling a length of the voltage space-vector to regulate stator currents of the induction machine to fulfill a condition that a current space-vector constituted by the stator currents has a pre-determined length, and
- estimating at least one of the following based on a waveform of a q-component of the current space-vector: rotation speed of the rotor of the induction machine, a direction of rotation of the rotor.

In accordance with the invention, there is provided also a new computer program for estimating rotation speed and/or a direction of rotation of an induction machine when the induction machine does not have enough magnetic flux for flux-based determination of the rotation speed and/or the direction of rotation. A computer program according to the invention comprises computer executable instructions for controlling a programmable processor to
- control stator voltages of an induction machine to constitute a voltage space-vector having a fixed direction with respect to the stator of the induction machine,
- control a length of the voltage space-vector to regulate stator currents of the induction machine to fulfill a condition that a current space-vector constituted by the stator currents has a pre-determined length, and
- estimate at least one of the following based on a waveform of a q-component of the current space-vector: rotation speed of the rotor of the induction machine, a direction of rotation of the rotor.

In accordance with the invention, there is provided also a new computer program product. The computer program product comprises a non-volatile computer readable medium, e.g. a compact disc "CD", encoded with a computer program according to the invention.

Various exemplifying and non-limiting embodiments are described in accompanied dependent claims.

Exemplifying and non-limiting embodiments both as to constructions and to methods of operation, together with additional objects and advantages thereof, are best understood from the following description of specific exemplifying embodiments when read in conjunction with the accompanying drawings.

The verbs "to comprise" and "to include" are used in this document as open limitations that neither exclude nor require the existence of un-recited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF FIGURES

Exemplifying and non-limiting embodiments and their advantages are explained in greater detail below with reference to the accompanying drawings, in which.

DETAILED DESCRIPTION

The specific examples provided in the description below should not be construed as limiting the scope and/or the applicability of the accompanied claims. Lists and groups of examples provided in the description below are not exhaustive unless otherwise explicitly stated.

Figure 1:
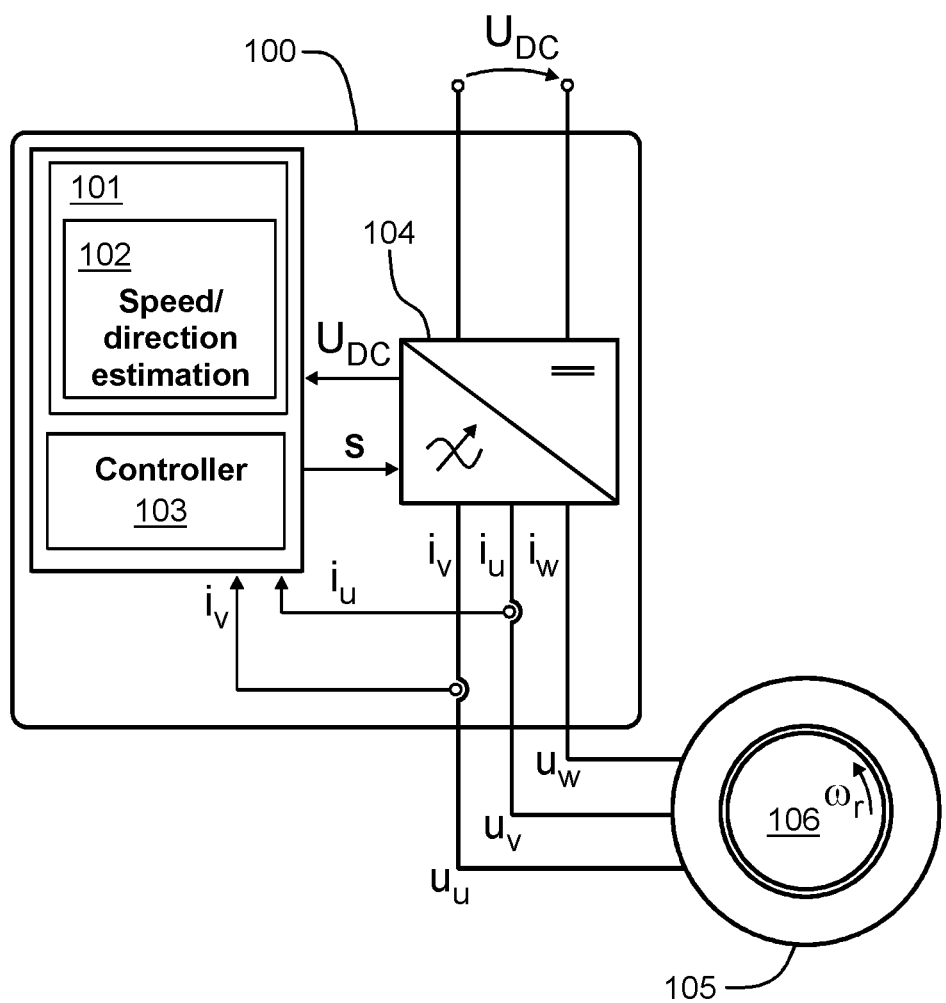
FIG. 1 illustrates a power electronic converter that comprises a device according to an exemplifying and non-limiting embodiment for estimating rotation speed and/or a direction of rotation of an induction machine when the induction machine does not have enough magnetic flux for flux-based determination of the rotation speed and/or the direction of rotation.

FIG. 1 illustrates a power electronic converter 100 according to an exemplifying and non-limiting embodiment. The power electronic converter 100 comprises a converter stage 104 for forming stator voltages for an induction machine 105. The number of phases of the induction machine 105 is three for demonstration purposes, but a different number of phases is also possible. In FIG. 1, the stator phase voltages are denoted as $u_u$, $u_v$, and $u_w$. In the exemplifying case shown in FIG. 1, the input voltage of the power electronic converter 100 is direct "DC" voltage $U_{DC}$. It is also possible that the input voltage is e.g. three-phase alternating "AC" voltage. In this exemplifying case, the power electronic converter may comprise for example a rectifier and a DC-voltage intermediate circuit between the rectifier and the converter stage 104. The converter stage 104 can be configured to employ e.g. pulse width modulation "PWM" for converting the DC-voltage $U_{DC}$ into the stator voltages $u_u$, $u_v$, and $u_w$. It is however also possible that the converter stage 104 is a matrix converter stage for carrying out a direct conversion from e.g. three-phase input AC-voltage to the stator voltages $u_u$, $u_v$, and $u_w$ of the induction machine 105. The power electronic converter 100 further comprises a controller 103 for controlling the stator voltages $u_u$, $u_v$, and $u_w$ of the induction machine 105. In FIG. 1, a set of switch control values delivered by the controller 103 to the converter stage 104 is denoted with s. The controller 103 may comprise means for implementing different control modes such as one or more vector control modes and a scalar control mode. In a vector control mode, the controller 103 may control the stator voltages $u_u$, $u_v$, and $u_w$ at least partly based on stator currents $i_u$ and $i_v$ of the induction machine 105 and on machine parameters i.e. inductances and resistances of the induction machine 105. In the exemplifying situation shown in FIG. 1, it is assumed that the sum of the stator currents $i_u$, $i_v$, and $i_w$ is zero and thus the controller 103 needs only two stator currents $i_u$ and $i_v$ since $i_w = -i_u - i_v$.

The power electronic converter 100 further comprises a device 101 according to an exemplifying and non-limiting embodiment for estimating rotation speed $\omega_r$ and/or a direction of rotation of the induction machine 105 when the induction machine does not have enough magnetic flux for flux-based determination of the rotation speed $\omega_r$ and/or the direction of rotation.

Figure 2A:
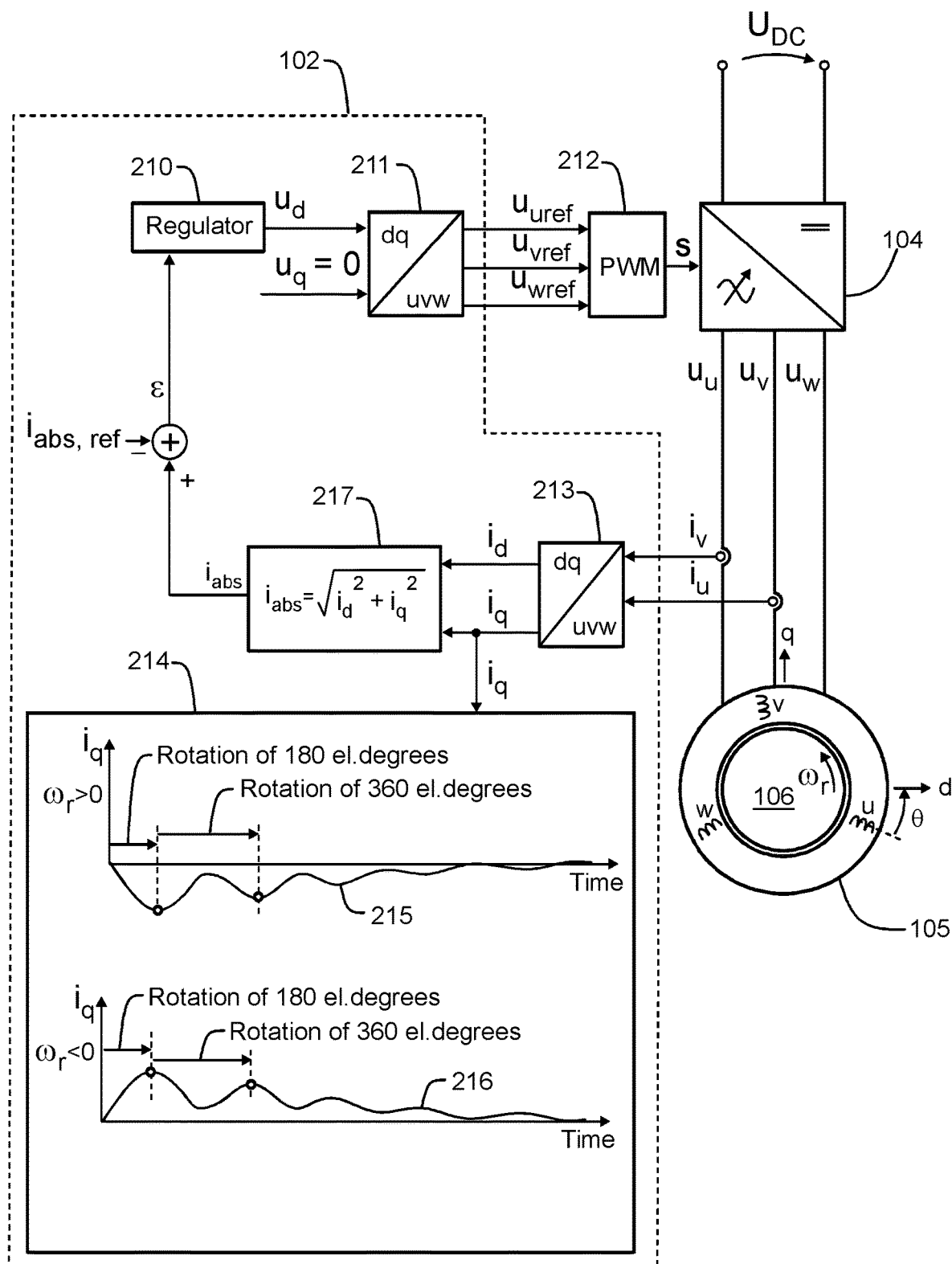
FIG. 2a shows a functional block-diagram of a device according to an exemplifying and non-limiting embodiment.

FIG. 2a shows an exemplifying functional block-diagram corresponding to a processing system 102 of the device 101 when the processing system 102 is estimating the rotation speed $\omega_r$ and/or the direction of rotation of the induction machine 105. The processing system 102 is configured to control the stator voltages $u_u$, $u_v$, and $u_w$ of the induction machine 105 to constitute a voltage space-vector having a fixed direction with respect to the stator of the induction machine 105. The voltage space-vector is defined as $(2/3)(u_u + au_v + a^2 u_w)$, where $a = (-1 + j\sqrt{3})/2$, where j is the imaginary unit. In FIG. 2a, the direction of the voltage space-vector is depicted with a d-axis of a dq-coordinate system that is fixed to the stator of the induction machine 105 since the voltage space-vector has the fixed direction with respect to the stator. Thus, the voltage space-vector is $u_d$. The processing system 102 is configured to implement a functional block 211 that converts the voltage space-vector into the reference stator voltages $u_{uref}$, $u_{vref}$, and $u_{wref}$ so that $u_{uref} = u_d \cos(\theta)$, $u_{vref} = u_d \cos(\theta - 120°)$, and $u_{wref} = u_d \cos(\theta - 240°)$, where $\theta$ is the angle between the d-axis of the dq-coordinate system and the magnetic axis of the phase u of the stator winding. The angle $\theta$ can be expressed e.g. in electrical degrees or in electrical radians. A functional block 212 that is implemented with the controller 103 shown in FIG. 1 converts the reference stator voltages $u_{uref}$, $u_{vref}$, and $u_{wref}$ into the set s of switch control values that are delivered to the converter stage 104.

The processing system 102 is configured to implement a functional block 213 that computes d- and q-components of a current space-vector constituted by the stator currents $i_u$, $i_v$, and $i_w$ so that:

$$i_d = (2/3)(i_u - i_v/2 - i_w/2)\cos(\theta) + (1/\sqrt{3})(i_v - i_w)\sin(\theta), \text{ and}$$

$$i_q = (1/\sqrt{3})(i_v - i_w)\cos(\theta) - (2/3)(i_u - i_v/2 - i_w/2)\sin(\theta), \qquad \text{a.}$$

where $i_w = -i_u - i_v$ and the d-component $i_d$ of the current space-vector is parallel with the voltage space-vector and the q-component $i_q$ of the current space-vector perpendicular to the voltage space-vector. Without limiting the generality, the fixed direction of the voltage space-vector can be selected to be the direction of the magnetic axis of the phase u, i.e. $\theta = 0$. In this exemplifying case:

$$i_d = (2/3)(i_u - i_v/2 - i_w/2) \text{ and } i_q = (1/\sqrt{3})(i_v - i_w).$$

The processing system 102 is configured to implement a functional block 217 that computes the length $i_{abs}$ of the current space-vector and a functional block 210 that controls the length of the voltage space-vector so that the stator currents $i_u$, $i_v$, and $i_w$ fulfill a condition that the current space-vector has a pre-determined length labs, ref. The functional block 210 can be for example a proportional "P" regulator, a proportional and integrating "PI" regulator, a proportional, integrating, and derivative "PID" regulator, or some other suitable regulator. The pre-determined length $i_{abs, ref}$ of the current space-vector can be for example within a range from 30% to 100% of a peak-value of a nominal current of the induction machine 105.

The processing system 102 is configured to implement a functional block 214 that estimates the direction of rotation and/or the rotation speed $\omega_r$ based on a waveform of the q-component $i_q$ of the current space-vector. Exemplifying ways to estimate the direction of rotation and/or the rotation speed $\omega_r$ are described below.

In a device according to an exemplifying and non-limiting embodiment, the processing system 102 is configured to detect a direction of change of the q-component $i_q$ at the beginning of fulfillment of the above-mentioned condition $i_{abs}$=labs, ref, and to determine the direction of rotation based on the detected direction of change. The direction of rotation is determined to be positive if the q-component $i_q$ first falls as illustrated by an exemplifying waveform 215 shown in FIG. 2a. Correspondingly, the direction of rotation is determined to be negative if the q-component $i_q$ first rises as illustrated by an exemplifying waveform 216 shown in FIG. 2a.

In a device according to an exemplifying and non-limiting embodiment, the processing system 102 is configured to detect a polarity of a first local extreme of the waveform of the q-component $i_q$ occurring after the beginning of fulfillment of the condition $i_{abs} = i_{abs, ref}$ and to determine the direction of rotation based on the detected polarity. The direction of rotation is determined to be positive if the first local extreme is negative as illustrated by the exemplifying waveform 215 shown in FIG. 2a. Correspondingly, the direction of rotation is determined to be negative if the first local extreme is positive as illustrated by the exemplifying waveform 216 shown in FIG. 2a.

In a device according to an exemplifying and non-limiting embodiment, the processing system 102 is configured to measure a first time-value $T_1$ indicative of time elapsed from the beginning of fulfillment of the condition $i_{abs} = i_{abs, ref}$ to a moment when the waveform of the q-component $i_q$ reaches its first local extreme value. The processing system 102 is configured to estimate the rotation speed $\omega_r$ based on the measured first time-value $T_1$ so that $\omega_{r,estimate} = \pi/T_1/p$, where p is the number of pole pairs of the induction machine 105.

In a device according to an exemplifying and non-limiting embodiment, the processing system 102 is configured to measure at least one second time-value $T_2$ indicative of time elapsed between two successive local maximum values or between two successive local minimum values of the waveform of the q-component $i_q$. The processing system 102 is configured to form an estimate for the rotation speed $\omega_r$ based on the measured second time-value $T_2$ so that $\omega_{r,estimate} = 2\pi/T_2/p$.

In a device according to an exemplifying and non-limiting embodiment, the processing system 102 is configured to apply two or more of the above-presented exemplifying ways to estimate the direction of rotation and/or the rotation speed $\omega_r$. The estimate of the rotation speed $\omega_r$ can be made more accurate by observing many local maximums, and/or many local minimums, of the waveform of the q-component $i_q$, but this increases the time needed to obtain the estimate.

In a device according to an exemplifying and non-limiting embodiment, the processing system 102 is configured to estimate the rotation speed $\omega_r$ in one or more of the above-described ways, and subsequently to control the stator voltages $u_u$, $u_v$, and $u_w$ so that the current space-vector is rotated at the estimated rotation speed. The current space-vector can be rotated e.g. so that the length of the current-space vector $(2/3)(i_u + ai_v + a^2 i_w)$ is controlled by controlling the length of the voltage space vector $(\frac{2}{3})(u_u+au_v+a^2u_w)$ and the rotational speed of the current space-vector is controlled by controlling the rotational speed of the voltage space vector.

In a device according to an exemplifying and non-limiting embodiment, the processing system 102 is configured to estimate a flowing direction of air-gap power $P_{ag}$ of the induction machine 105 based on the stator voltages $u_u$, $u_v$, and $u_w$, the stator currents $i_u$, $i_v$, and $i_w$, and the stator resistance when the current space-vector is rotated. The processing system 102 is configured to decrease the rotation speed of the current space-vector when the estimated flowing direction is towards the rotor 106 of the induction machine, and to increase the rotation speed of the current space-vector when the estimated flowing direction is out from the rotor of the induction machine. When magnetic energy contained by the induction machine 105 is substantially constant, the air-gap power can be estimated as:

$$P_{ag}=u_u i_u+u_v i_v+u_w i_w-R_s(i_u^2+i_v^2+i_w^2),$$

where $R_s$ is the stator resistance. If the estimated air-gap power flows towards the rotor, the induction machine 105 is acting as a motor and the estimate of the rotation speed i.e. the rotation speed of the current space-vector is too high. Correspondingly, if the estimated air-gap power flows out from the rotor, the induction machine 105 is acting as a generator and the estimate of the rotation speed i.e. the rotation speed of the current space-vector is too low.

In a device according to an exemplifying and non-limiting embodiment, the processing system 102 is configured to monitor whether the waveform of the q-component $i_q$ reaches a local extreme value within a predetermined time period after the beginning of fulfillment of the above-mentioned condition $i_{abs}=i_{abs,\,ref}$. If the rotor rotates so slowly that the q-component $i_q$ does not reach a local extreme value within the above-mentioned time period, the rotor is magnetized by the stator currents and a suitable known speed detection method for a magnetized rotor can be used after the above-mentioned time period. In other words, the processing system 102 can be configured to estimate, in response to a situation in which no local extreme value is reached within the above-mentioned time period, the rotation speed $\omega_r$ and/or the direction of rotation based on behavior of the induction machine 105 having a magnetic flux generated during the above-mentioned time period. A speed detection method for a magnetized rotor may comprise for example: arranging a sequence of stator short-circuits, measuring short-circuit currents of the stator, and estimating the speed and/or the direction of rotation based on the measured short-circuit currents.

Figure 2B:
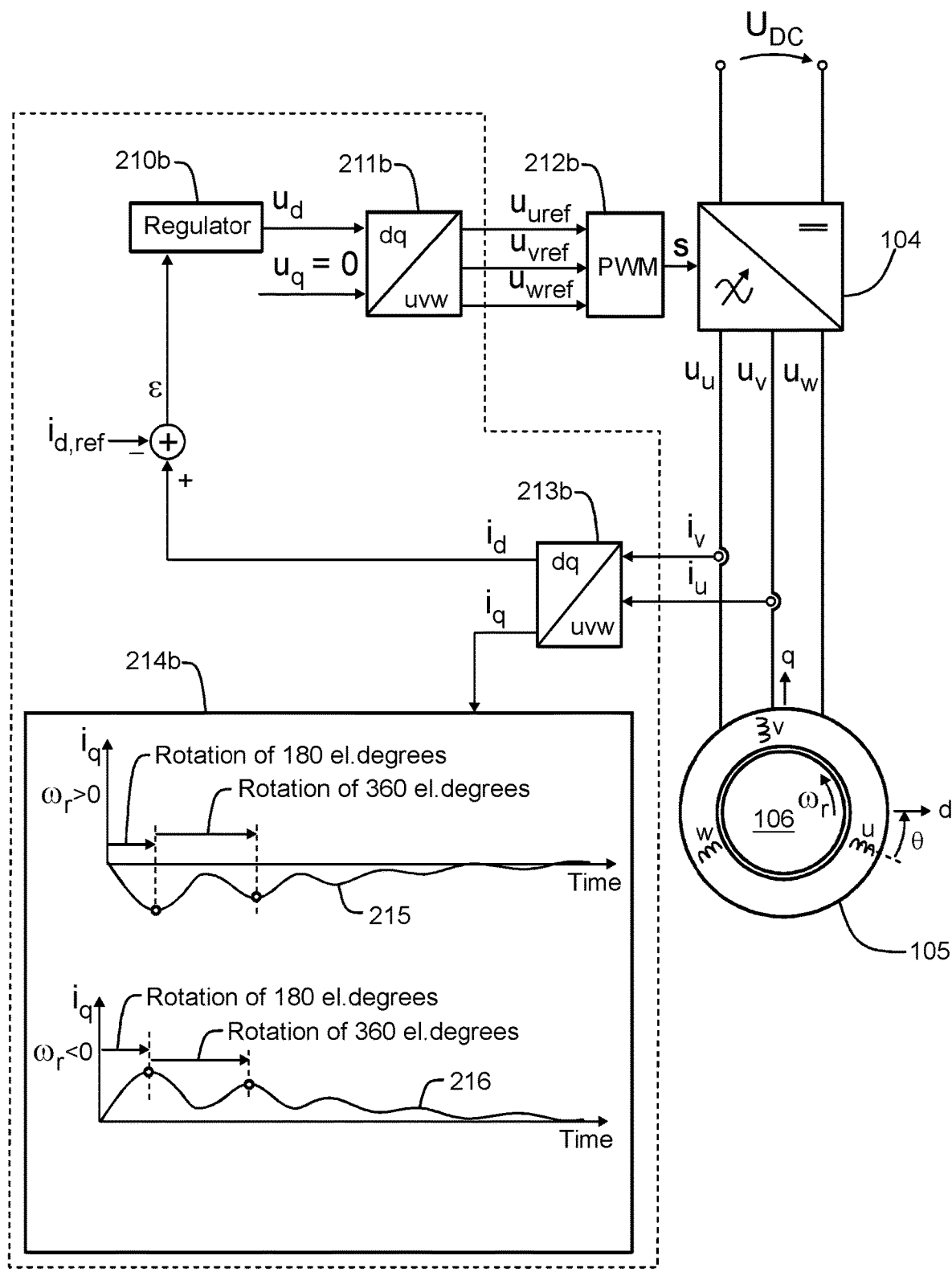
FIG. 2b shows a functional block-diagram of a device according to another exemplifying and non-limiting embodiment.

FIG. 2b shows an exemplifying functional block-diagram that corresponds to a processing system of a device according to an exemplifying and non-limiting embodiment. The functional block-diagram shown in FIG. 2b corresponds to the processing system when the processing system is estimating the rotation speed $\omega_r$ and/or the direction of rotation of the induction machine 105. In this exemplifying case, the processing system is configured to control the length of the voltage space-vector so that the stator currents $i_u$, $i_v$, and $i_w$ fulfill a condition that the current space-vector has a pre-determined d-component $i_{d,ref}$ i.e. $i_d=i_{d,ref}$. The pre-determined d-component $i_{d,ref}$ of the current space-vector can be for example within a range from 20% to 70% of the peak-value of the nominal current of the induction machine 105. The functional blocks 210b, 211b, 212b, 213b, and 214b shown in FIG. 2b can be like the functional blocks 210-211 shown in FIG. 2a, respectively. The exemplifying embodiment illustrated in FIG. 2b requires less computation than the exemplifying embodiment illustrated in FIG. 2a since the length of the current space-vector is not computed in the exemplifying embodiment illustrated in FIG. 2b. However, in some situations, the exemplifying embodiment illustrated in FIG. 2a can provide better results since e.g. the saturation state of the induction machine 105 can be controlled better when using the exemplifying embodiment illustrated in FIG. 2a.

The processing system 102 shown in FIG. 1 can be implemented with one or more processor circuits, each of which can be a programmable processor circuit provided with appropriate software, a dedicated hardware processor such as for example an application specific integrated circuit "ASIC", or a configurable hardware processor such as for example a field programmable gate array "FPGA". Furthermore, the processing system may comprise one or more memory devices each of which can be for example a Random-Access-Memory "RAM" circuit. In many power electronic converters, a device according to an exemplifying and non-limiting embodiment for estimating rotation speed and/or a direction of rotation can be implemented using the hardware of the control system of the power electronic converter.

The above-described device 101 is an example of a device that comprises:

means for controlling stator voltages of an induction machine to constitute a voltage space-vector having a fixed direction with respect to the stator of the induction machine, means for controlling a length of the voltage space-vector to regulate stator currents of the induction machine to fulfill a condition being one of the following: a) a current space-vector constituted by the stator currents has a pre-determined length, b) the current space-vector has a predetermined d-component parallel with the voltage space-vector, and means for estimating rotation speed of the rotor of the induction machine and/or a direction of rotation of the rotor based on a waveform of a q-component of the current space-vector, the q-component being perpendicular to the voltage space-vector.

Figure 3:
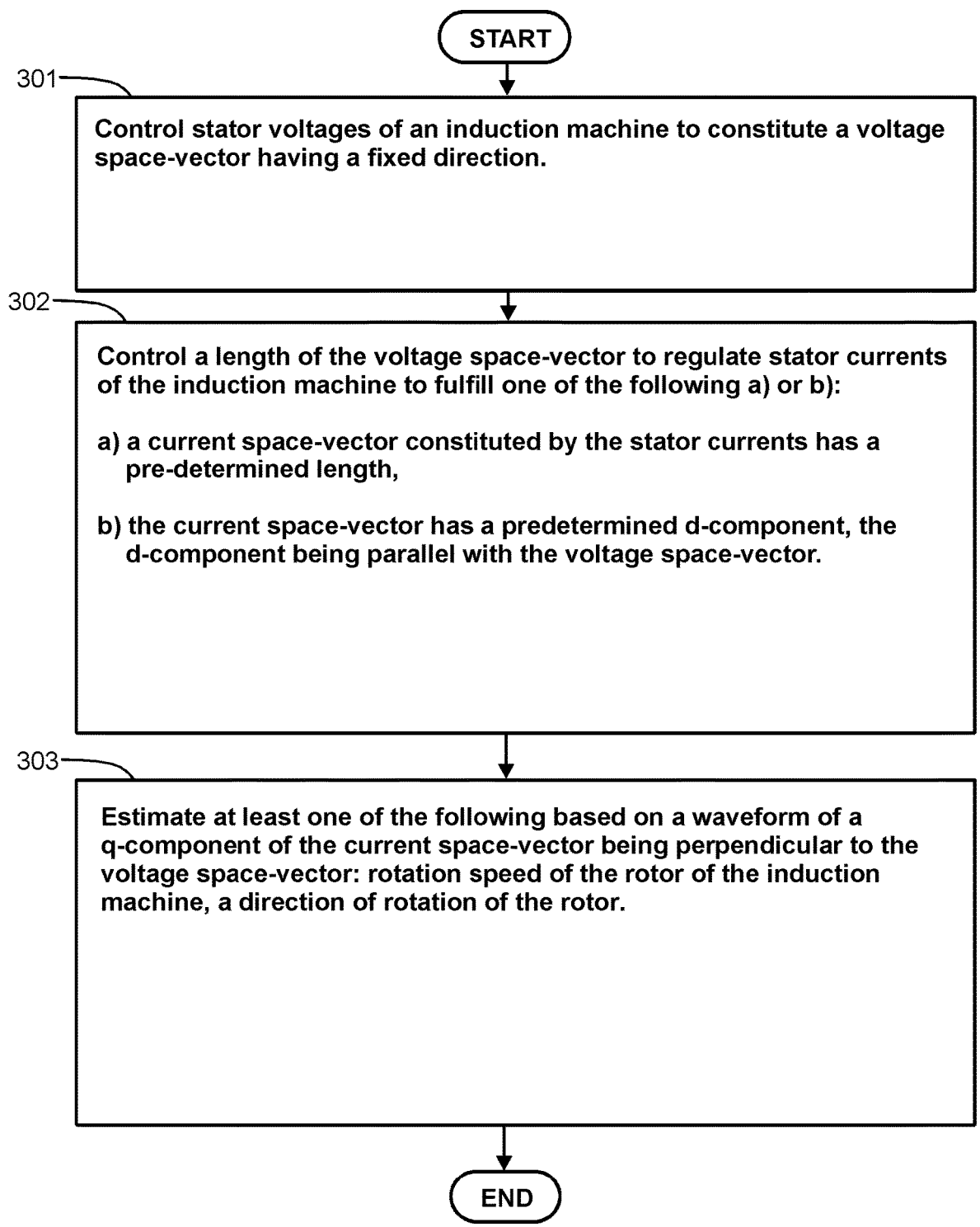
FIG. 3 shows a flowchart of a method according to an exemplifying and non-limiting embodiment for estimating rotation speed and/or a direction of rotation of an induction machine when the induction machine does not have enough magnetic flux for flux-based determination of the rotation speed and/or the direction of rotation.

FIG. 3 shows a flowchart of a method according to an exemplifying and non-limiting embodiment for estimating rotation speed and/or a direction of rotation of an induction machine when the induction machine does not have enough magnetic flux for flux-based determination of the rotation speed and/or the direction of rotation. The method comprises the following actions:

action 301: controlling stator voltages of the induction machine to constitute a voltage space-vector having a fixed direction with respect to the stator of the induction machine, action 302: controlling a length of the voltage space-vector to regulate stator currents of the induction machine to fulfill a condition being one of the following: a) a current space-vector constituted by the stator currents has a pre-determined length, b) the current space-vector has a predetermined d-component parallel with the voltage space-vector, and action 303: estimating the rotation speed of the rotor of the induction machine and/or the direction of rotation of the rotor based on a waveform of a q-component of the current space-vector, the q-component being perpendicular to the voltage space-vector.

A method according to an exemplifying and non-limiting embodiment comprises:

detecting a direction of change of the q-component of the current space-vector at the beginning of fulfillment of the condition related to the stator currents, and determining the direction of rotation based on the detected direction of change.

A method according to an exemplifying and non-limiting embodiment comprises:

detecting a polarity of a first local extreme of the waveform of the q-component of the current space-vector occurring after the beginning of fulfillment of the condition related to the stator currents, and determining the direction of rotation based on the detected polarity.

A method according to an exemplifying and non-limiting embodiment comprises:

measuring a first time-value indicative of time elapsed from the beginning of fulfillment of the condition related to the stator currents to a moment when the waveform of the q-component of the current space-vector reaches its first local extreme value, and estimating the rotation speed based on the measured first time-value.

A method according to an exemplifying and non-limiting embodiment comprises:

measuring at least one second time-value indicative of time elapsed between two local maximum values or between two local minimum values of the waveform of the q-component of the current space-vector, and estimating the rotation speed based on the measured at least one second time-value.

A method according to an exemplifying and non-limiting embodiment comprises estimating the rotation speed based on the waveform of the q-component of the current space-vector, and subsequently controlling the stator voltages to rotate the current space-vector at the estimated rotation speed.

A method according to an exemplifying and non-limiting embodiment comprises:

estimating a flowing direction of air-gap power of the induction machine based on the stator voltages, the stator currents, and the stator resistance when the current space-vector is rotated at the estimated rotation speed, decreasing the rotation speed of the current space-vector when the estimated flowing direction is towards the rotor of the induction machine, and increasing the rotation speed of the current space-vector when the estimated flowing direction is out from the rotor of the induction machine.

A method according to an exemplifying and non-limiting embodiment comprises:

monitoring whether the waveform of the q-component of the current space-vector reaches a local extreme value within a predetermined time period after the beginning of fulfillment of the condition related to the stator currents, and estimating, in response to a situation in which no local extreme value is reached within the predetermined time period, the rotation speed and/or the direction of rotation based on behavior of the induction machine having a magnetic flux generated during the predetermined time period.

In a method according to an exemplifying and non-limiting embodiment, the condition related to the stator currents is that the current space-vector has the pre-determined length, and the pre-determined length is within the range from 30% to 100% of a peak-value of a nominal current of the induction machine.

In a method according to an exemplifying and non-limiting embodiment, the condition related to the stator currents is that the current space-vector has the predetermined d-component, and the pre-determined d-component is within the range from 20% to 70% of the peak-value of the nominal current of the induction machine.

A computer program according to an exemplifying and non-limiting embodiment comprises computer executable instructions for controlling a programmable processor to carry out actions related to a method according to any of the above-described exemplifying and non-limiting embodiments.

A computer program according to an exemplifying and non-limiting embodiment comprises software modules for estimating rotation speed and/or a direction of rotation of an induction machine when the induction machine does not have enough magnetic flux for flux-based determination of the rotation speed and/or the direction of rotation. The software modules comprise computer executable instructions for controlling a programmable processor to:

control stator voltages of the induction machine to constitute a voltage space-vector having a fixed direction with respect to the stator of the induction machine, control a length of the voltage space-vector to regulate stator currents of the induction machine to fulfill a condition being one of the following: a) a current space-vector constituted by the stator currents has a pre-determined length, b) the current space-vector has a predetermined d-component parallel with the voltage space-vector, and estimate the rotation speed of the rotor of the induction machine and/or the direction of rotation of the rotor based on a waveform of a q-component of the current space-vector, the q-component being perpendicular to the voltage space-vector.

The above-mentioned software modules can be e.g. subroutines and/or functions implemented with a programming language suitable for the programmable processor under consideration.

A computer program product according to an exemplifying and non-limiting embodiment comprises a computer readable medium, e.g. a compact disc "CD", encoded with a computer program according to an exemplifying embodiment.

A signal according to an exemplifying and non-limiting embodiment is encoded to carry information that defines a computer program according to an exemplifying embodiment.

The non-limiting, specific examples provided in the description given above should not be construed as limiting the scope and/or the applicability of the appended claims. Furthermore, any list or group of examples presented in this document is not exhaustive unless otherwise explicitly stated.

What is claimed is:

1. A device, wherein the device comprises a processing system implemented with one or more processor circuits configured to:

control stator voltages of an induction machine to constitute a voltage space-vector having a fixed direction with respect to a stator of the induction machine, control a length of the voltage space-vector to regulate stator currents of the induction machine to fulfill a condition that a current space-vector constituted by the stator currents has a pre-determined length, and estimate at least one of the following based on a waveform of a q-component of the current space-vector: rotation speed of a rotor of the induction machine, a direction of rotation of the rotor, wherein a d-component of the current space-vector is parallel with the voltage space-vector and the q-component of the current space-vector is perpendicular to the voltage space-vector.

2. The device according to claim 1, wherein the processing system is configured to detect a direction of change of the q-component of the current space-vector at a beginning of fulfillment of the condition related to the stator currents, and to determine the direction of rotation based on the detected direction of change.

3. The device according to claim 1, wherein the processing system is configured to detect a polarity of a first local extreme of the waveform of the q-component of the current space-vector occurring after a beginning of fulfillment of the condition related to the stator currents, and to determine the direction of rotation based on the detected polarity.

4. The device according to claim 1, wherein the processing system is configured to measure a first time-value indicative of time elapsed from a beginning of fulfillment of the condition related to the stator currents to a moment when the waveform of the q-component of the current space-vector reaches a first local extreme value after the beginning of fulfillment of the condition related to the stator currents, and to estimate the rotation speed based on the measured first time-value.

5. The device according to claim 1, wherein the processing system is configured to measure at least one second time-value indicative of time elapsed between two local maximum values or between two local minimum values of the waveform of the q-component of the current space-vector, and to estimate the rotation speed based on the measured at least one second time-value.

6. The device according to claim 1, wherein the processing system is configured to estimate the rotation speed based on the waveform of the q-component of the current space-vector, and subsequently to control the stator voltages to rotate the current space-vector at the estimated rotation speed.

7. The device according to claim 6, wherein the processing system is configured to estimate a flowing direction of air-gap power of the induction machine based on the stator voltages, the stator currents, and stator resistance when the current space-vector is rotated, to decrease the rotation speed of the current space-vector when the estimated flowing direction is towards the rotor of the induction machine, and to increase the rotation speed of the current space-vector when the estimated flowing direction is out from the rotor of the induction machine.

8. The device according to claim 1, wherein the processing system is configured to:
monitor whether the waveform of the q-component of the current space-vector reaches a local extreme value within a predetermined time period after a beginning of fulfillment of the condition related to the stator currents, and
estimate, in response to a situation in which the q-component of the current space-vector reaches no local extreme value within the predetermined time period, at least one of the following based on behavior of the induction machine having a magnetic flux generated during the predetermined time period: the rotation speed, the direction of rotation.

9. The device according to claim 1, wherein the condition related to the stator currents is that the current space-vector has the pre-determined length, and the pre-determined length is within a range from 30% to 100% of a peak-value of a nominal current of the induction machine.

10. The device according to claim 1, wherein the condition related to the stator currents is that the current space-vector has the predetermined d-component, and the pre-determined d-component is within a range from 20% to 70% of a peak-value of a nominal current of the induction machine.

11. A power electronic converter comprising:
a converter stage for forming stator voltages for an induction machine,
a controller for controlling the stator voltages at least partly based on stator currents of the induction machine, and
a device according to claim 1 for estimating at least one of the following: a rotation speed of a rotor of the induction machine, a direction of rotation of the rotor.

12. A method, wherein the method comprises:
controlling stator voltages of an induction machine to constitute a voltage space-vector having a fixed direction with respect to a stator of the induction machine,
controlling a length of the voltage space-vector to regulate stator currents of the induction machine to fulfill a condition that a current space-vector constituted by the stator currents has a pre-determined length, and
estimating at least one of the following based on a waveform of a q-component of the current space-vector: rotation speed of a rotor of the induction machine, a direction of rotation of the rotor, wherein a d-component of the current space-vector is parallel with the voltage space-vector and the q-component of the current space-vector is perpendicular to the voltage space-vector.

13. A computer program, wherein the computer program comprises computer executable instructions for controlling a programmable processor to:
control stator voltages of an induction machine to constitute a voltage space-vector having a fixed direction with respect to a stator of the induction machine,
control a length of the voltage space-vector to regulate stator currents of the induction machine to fulfill a condition that a current space-vector constituted by the stator currents has a pre-determined length, and
estimate at least one of the following based on a waveform of a q-component of the current space-vector: rotation speed of a rotor of the induction machine, a direction of rotation of the rotor, wherein a d-component of the current space-vector is parallel with the voltage space-vector and the q-component of the current space-vector is perpendicular to the voltage space-vector.

14. A non-volatile computer readable medium encoded with a computer program according to claim 13.

* * * * *